(12) United States Patent
Vesterinen et al.

(10) Patent No.: US 9,839,056 B2
(45) Date of Patent: Dec. 5, 2017

(54) LINK MODEL FOR MULTI-PREFIX PACKET SYSTEM BEARER

(75) Inventors: Seppo Ilmari Vesterinen, Oulunsalo (FI); Jouni Korhonen, Riihimäki (FI); Matti Einari Laitila, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 157 days.

(21) Appl. No.: 14/363,083

(22) PCT Filed: Dec. 7, 2011

(86) PCT No.: PCT/EP2011/072045
§ 371 (c)(1),
(2), (4) Date: Sep. 23, 2014

(87) PCT Pub. No.: WO2013/083189
PCT Pub. Date: Jun. 13, 2013

(65) Prior Publication Data
US 2015/0055571 A1 Feb. 26, 2015

(51) Int. Cl.
*H04W 76/02* (2009.01)
*H04L 29/12* (2006.01)
*H04W 48/08* (2009.01)
*H04W 92/02* (2009.01)

(52) U.S. Cl.
CPC ....... *H04W 76/022* (2013.01); *H04L 61/2007* (2013.01); *H04L 61/2092* (2013.01); *H04L 61/6068* (2013.01); *H04L 61/6077* (2013.01); *H04W 48/08* (2013.01); *H04W 76/025* (2013.01); *H04W 92/02* (2013.01)

(58) Field of Classification Search
None
See application file for complete search history.

(56) References Cited

U.S. PATENT DOCUMENTS

2011/0110378 A1    5/2011   Savolainen et al.

OTHER PUBLICATIONS

J. Korhonen, et al.; "IPv6 in 3GPP Evolved Packet System"; No. 8, Sep. 30, 2011 (Sep. 30, 2011); pp. 1-35.
International Search Report dated Nov. 20, 2012 corresponding to International Patent Application No. PCT/EP2011/072045.
3GPP TR 23.829 V10.0.1 (Oct. 2011), Technical Specification, 3rd Generation Partnership Project; Technical Specification Group Services and System Aspects; Local IP Access and Selected IP Traffic Offload (LIPA-SIPTO) (Release 10), Oct. 18, 2011, pp. 1-43, XP050554389.

*Primary Examiner* — Kwang B Yao
*Assistant Examiner* — Adam Duda
(74) *Attorney, Agent, or Firm* — Squire Patton Boggs (US) LLP

(57) ABSTRACT

A second internet protocol network is logically connected to a packet data network connection provided between a user equipment and a first internet protocol network over a radio access network, the second internet protocol network located on a data path from the first internet protocol network to the user equipment. The first internet protocol network represents the highest level internet protocol point of attachment to the packet data network connection. Router advertisements are sent from the second internet protocol network to the user equipment over the radio access network via the packet data network connection.

10 Claims, 6 Drawing Sheets

LINK MODEL FOR MULTI-PREFIX PACKET SYSTEM BEARER

BACKGROUND OF THE INVENTION

Field of the Invention

The present invention relates to methods and apparatuses for providing a link model for a multi-prefix packet system bearer, e.g. an evolved packet system bearer.

Related Background Art

The following meanings for the abbreviations used in this specification apply:
3GPP Bearer=a dedicated point to point connection for a UE
3GPP=third generation partnership project
ANDSF=access network discovery and selection function
API=application programming interface
APN=access point name
DSMIPv6=dual stack mobile IPv6
eNB=evolved nodeB
EPS=evolved packet system
GGSN=gateway GPRS support node
GPRS=general packet radio service
GRE=generic routing encapsulation
GTP=GPRS tunneling protocol
HeNB=home eNodeB
IAP=internet access point
IPv6=internet protocol version 6
ISP=internet service provider
L1=Layer 1=physical layer
Link=interface at link layer (layer 2)
L-GW=local gateway
LIPA=local IP access
MAPCON=multi access PDN connectivity
MME=mobility management entity
NIC=network interface connection at physical layer
OPIIS=operator policies for IP interface selection
OS=operating system
PDN=packet data network
PDP=packet data protocol
PGW=P-GW=packet data gateway
PMIPv6=proxy mobile IPv6
PPP=point to point protocol
RA=routing advertisement
RAT=radio access technology
SGW=S-GW=serving gateway
SIPTO=selected IP traffic offload
UE=user equipment
ULA=unique local address
USB=universal serial bus 3GPP Rel-8 has introduced dual-stack for EPS, and 3GPP Rel-9 has supported dual-stack correspondingly for GPRS bearers. That is, PDN/PDP type has been extended to IPv4v6, i.e., both IPv4 and IPv6 addresses are available to a UE.

Based on agreed IP addressing principle, exactly one IPv4 address and exactly one IPv6 prefix can be assigned to the UE (excluding link scoped prefix) per a PDN connection/PDP context.

New features beyond 3GPP Rel-9 like LIPA, SIPTO, MAPCON, OPIIS and equivalent mechanisms have shown that there is a need for more IPv6 prefixes per bearer, for example to have a separate prefix for user traffic "offloading" purposes.

The current 3GPP bearer model is proprietary and tailored for 3GPP terminals by assuming that end-users will use mobile operator provided packet switched services.

However, smart phones are coming into the market that use ordinary internet services, and their operating systems implement their IP stack and network interfaces at link layer according to generic IP networking principles. Thus, interworking between applications using socket based IP stack in a smart phone OS and a 3G modem using bearers is quite complex.

A proprietary 3GPP bearer model that is limited to one IPv6 prefix per PDN is becoming problematic especially when IPv6 will be applied in larger scale.

IPv6 is by design a multi-addressed and -prefix architecture, in which an interface must have a link scoped prefix and then may have zero or more prefixes of wider scope (ULAs, globals, . . . ). ISPs with complex content & service provisioning structure and access infrastructure sharing settlements make use thereof.

The 3GPP bearer model comprises an "old" point-to-point link model used since GPRS, in which the link is between a UE and a PGW/GGSN, and a "new" point-to-point link model used with PMIPv6, in which the link is between a UE and an SGW but an IPv6 prefix/IPv4 address is still topologically anchored to a PGW.

Since GPRS times 3GPP compliant host OSes have abstracted a PDP connection as a dial-up "PPP-like" interface. Modern host OSes wish to abstract everything as IEEE802 type interface. This results in not working combinations due to false assumptions made at both end host and network side regarding link model and addressing.

A 3GPP solution for multiple prefixes is to establish a new default bearer (PDN connection) each time a new prefix is needed in the UE. However, this causes unnecessary overhead.

According to patent application US 2011/110378 A1 "Method And Apparatus For Communications Traffic Breakout", published on May 12, 2011, more than one address per PDN connection/PDP context is used in order to offload local breakout traffic in a "middle-box" on the data path by using source address lookup (IP address, Ethernet address, or the like).

According to these applications, the current 3GPP bearer model is changed to support multiple addresses per PDN connection.

SUMMARY OF THE INVENTION

Methods and apparatuses are proposed that overcome the above drawbacks. In particular, methods and apparatuses are proposed that provide for a link model for a multi-prefix packet system bearer, e.g. a multi-prefix EPS bearer.

These methods and apparatuses are defined in the appended claims. The invention may also be implemented by a computer program product.

According to an embodiment, an IP link model for a multi-homed link that is passing via multiple network elements is provided.

Smooth interworking between applications using a socket based IP stack in a smart phone OS and a 3G modem using bearers can be achieved with this link model.

The above and still further objects, features and advantages of the invention will become more apparent upon referring to the description and the accompanying drawings.

DESCRIPTION OF PREFERRED EMBODIMENTS

In the following, examples and embodiments of the present invention are described with reference to the drawings.

Figure 1:
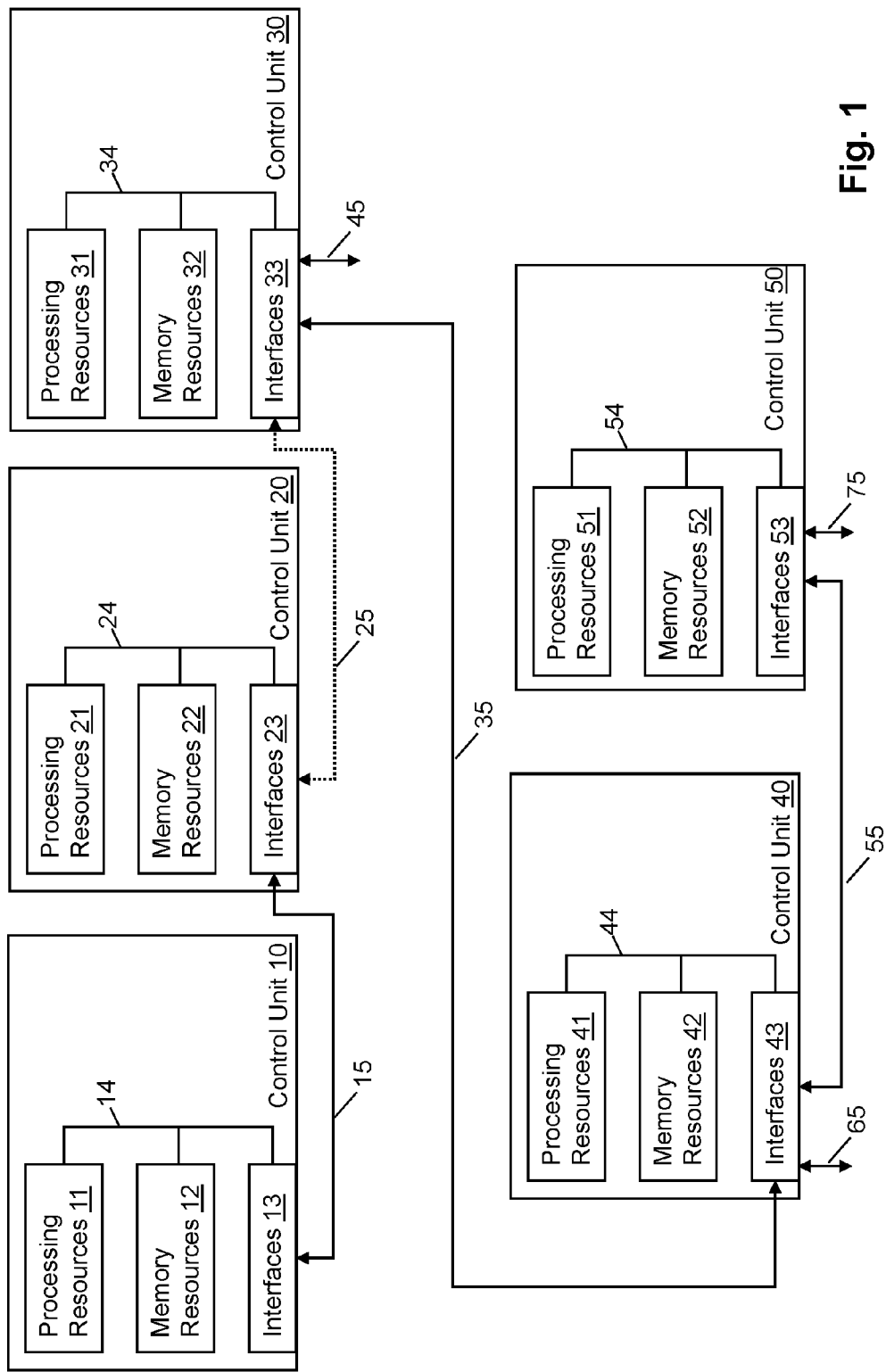
FIG. 1 shows a schematic block diagram illustrating a structure of control units for entities of a link model, according to an embodiment of the invention.

As a preliminary matter before exploring details of various implementations, reference is made to FIG. 1 for illustrating a simplified block diagram of various electronic devices that are suitable for use in practicing the exemplary embodiments of this invention.

A control unit 10, which may be part of e.g. a laptop PC and may function as an end host, comprises processing resources 11, memory resources 12 and interfaces 13 which are interconnected by a link 14. The memory resources 12 may store a program that is executed by the processing resources 11. The interfaces 13 may comprise a NIC L1 interface. The control unit 10 is connected to a control unit 20 via the interfaces 13 over a link 15, e.g. USB.

The control unit 20, which may be part of a 3GPP terminal/modem (also referred to as UE in the following), comprises processing resources 21, memory resources 22 and interfaces 23 which are interconnected by a link 24. The memory resources 22 may store a program that is executed by the processing resources 21. The interfaces 23 may comprise a NIC L1 interface and a 3GPP radio interface. The control unit 20 is connected to the control unit 10 via the interfaces 23 over the link 15, and is connected to a control unit 30 via the interfaces 23 over a radio link 25.

The control unit 30, which may be part of a (H)eNB/L-GW of a communications network system, comprises processing resources 31, memory resources 32 and interfaces 33 which are interconnected by a link 34. The memory resources 32 may store a program that is executed by the processing resources 31. The interfaces 33 may comprise a NIC L1 interface, a 3GPP radio interface and an S1 interface. The control unit 30 is connected to the control unit 20 via the interfaces 33 over the radio link 25, to a control unit 40 via the interfaces 33 over a link 35 and to a network (not shown) via the interfaces 33 over a link 45.

The control unit 40, which may be part of an S-GW of the communications network system, comprises processing resources 41, memory resources 42 and interfaces 43 which are interconnected by a link 44. The memory resources 42 may store a program that is executed by the processing resources 41. The interfaces 43 may comprise a NIC L1 interface, an S1 interface and an S5 interface. The control unit 40 is connected to the control unit 30 via the interfaces 43 over the link 35, to a control unit 50 via the interfaces 43 over a link 55 and to a network (not shown) via the interfaces 43 over a link 65.

The control unit 50, which may be part of a P-GW/GGSN of the communications network system, comprises processing resources 51, memory resources 52 and interfaces 53 which are interconnected by a link 54. The memory resources 52 may store a program that is executed by the processing resources 51. The interfaces 53 may comprise a NIC L1 interface and an S5 interface. The control unit 50 is connected to the control unit 40 via the interfaces 53 over the link 55 and to a network (not shown) via the interfaces 53 over a link 75.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

In general, the exemplary embodiments of this invention may be implemented by computer software stored in the memory resources and executable by the corresponding processing resources, or by hardware, or by a combination of software and/or firmware and hardware in any or all of the devices shown.

The memory resources may be of any type suitable to the local technical environment and may be implemented using any suitable data storage technology, such as semiconductor-based memory devices, magnetic memory devices and systems, optical memory devices and systems, fixed memory and removable memory. The processing resources may be of any type suitable to the local technical environment, and may include one or more of general purpose computers, special purpose computers, microprocessors, digital signal processors (DSPs) and processors based on a multi-core processor architecture, as non-limiting examples.

As described in the following, one PDN connection is capable to handle multiple different IPv6 prefixes. In other words, multiple APNs are not used, multiple interfaces (that multiple PDN connections usually imply) on UE side can be avoided, and end host OS default address selection takes care of addressing complexity, i.e. avoids 3GPP specific solutions that rely on traditional control model of the end hosts like ANDSF routing policies or DSMIPv6 (S2c) traffic selectors.

According to an embodiment, a multi-homed link model for a one PDN connection (or APN) that is passing via multiple network elements is proposed in which a P-GW/GGSN provides a "default" IP point of attachment and intermediate local IPv6 networks on a data-path to a UE are connected logically to the same logical link by using physical network interfaces at S-GW and L-GW or (H)eNB nodes that are located at these local IP networks and established tunnels (e.g. GTP or GRE) that are associated to EPS bearer services within a PDN connection.

This logical link allows emulation of a multi-homed link so that a UE is able to receive router advertisements from multiple IPv6 networks and configure IPv6 addresses for different services within the same PDN connection in a manner that is friendly to modern operating systems in smart phones.

Router advertisements from intermediate local IP networks are not advertised to upper networks in the IP network topology within this logical link, i.e. only the UE will receive a router advertisement from all the IP networks connected to this logical link separately. For example, if the UE sees three networks, it will receive router advertisements from three different sources. One router advertisement can contain zero or more prefixes (zero for the case when unnumbered link model has to be supported). Furthermore, the prefix management is not centralized. Rather, each network function sourcing a router advertisement is responsible for its own IPv6 prefix space and having topologically correct IP routing in place.

Figure 2:
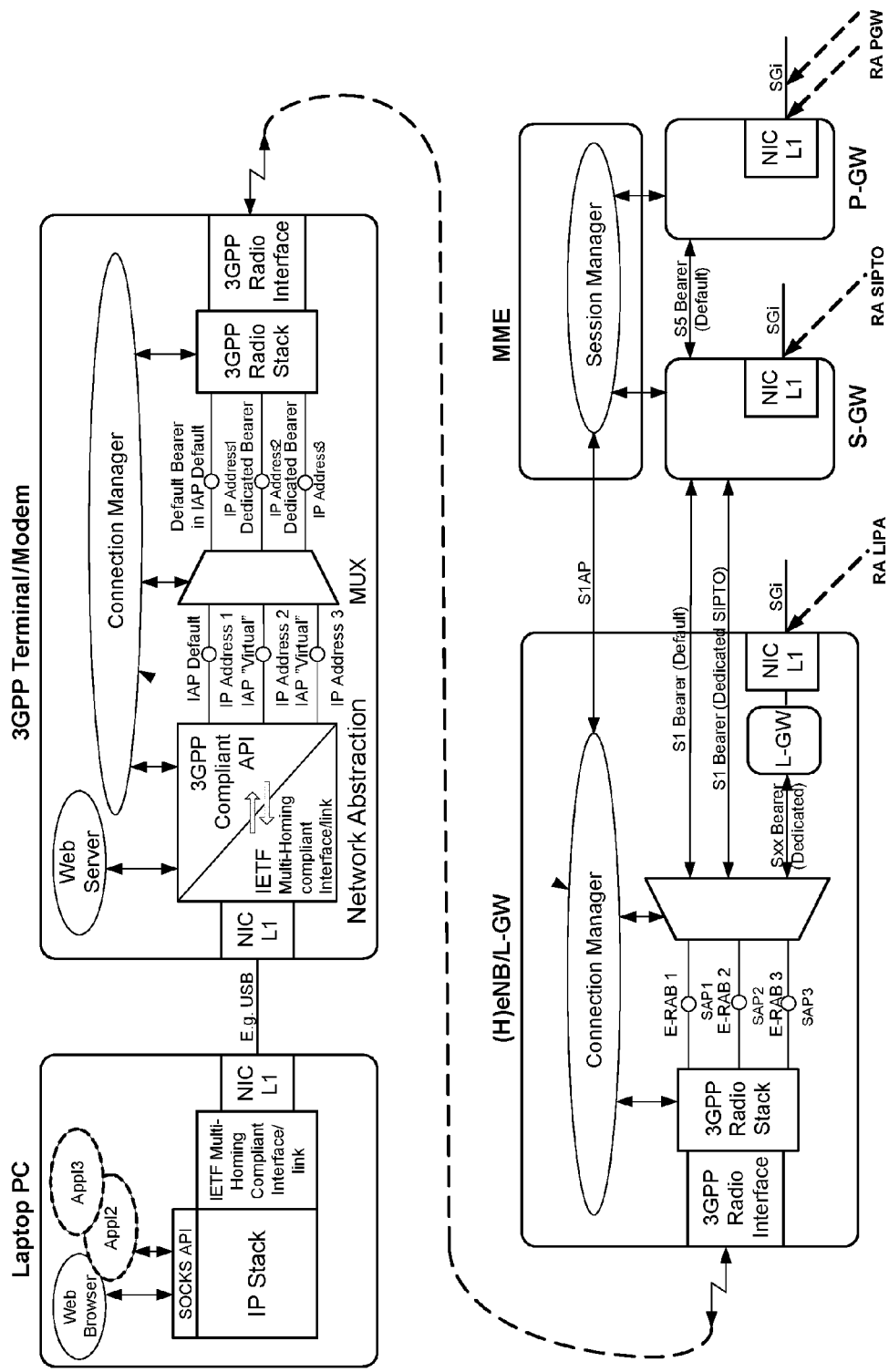
FIG. 2 shows a diagram illustrating a multi-homed link model for on PDN connection according to an embodiment of the invention.

FIG. 2 illustrates a detailed multi-homed link model for a one PDN connection.

A UE (3GPP Terminal/Modem) receives combined router advertisements (RA PGW+RA SIPTO+RA LIPA in FIG. 2) from each SGi interface at P-GW, S-GW and L-GW.

A network interface driver software in the 3GPP Terminal/Modem emulates an IETF multi-homing compliant interface/link towards a modern operating system in a smart phone or a personal computer as shown in FIG. 2. Each "access" shows up as a next-hop router to the personal computer as end host. On a bearer level, "PGW access/link" gets mapped to a default bearer. Other "accesses/links" get mapped to dedicated bearers.

As shown in FIG. 2, networks are logically connected to a PDN connection provided between the 3GPP terminal/modem and the P-GW by using NIC L1 and SGi interfaces at the S-GW and L-GW or (H)eNB nodes. The NIC L1 and SGi interfaces at the P-GW also connect to a network and this access is mapped to the default bearer transmitted between the P-GW and the S-GW over S5 interface. A session manager in an MME manages sessions in the S-GW and the P-GW.

The S-GW access is mapped to a dedicated bearer SIPTO transmitted over S1 interface between the S-GW and the L-GW/(H)eNB. The L-GW access is mapped to a dedicated bearer. The default and dedicated bearers are mapped to radio access bearers E-RAB 1, E-RAB 2 and E-RAB 3 by a connection manager at the (H)eNB. The connection manager is connected to the session manager over an S1AP interface. The default and dedicated bearers are transmitted via a 3GPP radio stack managed by the connection manager over a 3GPP radio interface between the (H)eNB and the 3GPP terminal/modem.

A connection manager at the 3GPP terminal/modem maps the transmitted default and dedicated bearers to default and virtual IAPs at IP addresses 1, 2 and 3, which are assigned for corresponding IAPs using advertised prefixes. As mentioned above, the network interface driver SW (3GPP compliant API) emulates the IETF multi-homing interface/link towards the laptop PC, i.e. performs network abstraction. Data packets are transmitted between the 3GPP terminal/modem and the laptop PC via NIC L1 interfaces, for example over USB.

The OS running at the laptop PC takes care of addressing complexity using the IETF multi-homing compliant interface/link and IP stack.

Referring again to FIG. 1, the laptop PC may contain the control unit 10 and connect over the link 15 to the 3GPP terminal/modem containing the control unit 20. The 3GPP terminal/modem may connect to the (H)eNB/L-GW containing the control unit 30 over the link 25. The (H)eNB/L-GW may connect to the S-GW containing the control unit 40 over the link 35. And the S-GW may connect to the P-GW containing the control unit 50 over the link 55. The (H)eNB/L-GW may connect to a network over the link 45, the S-GW may connect to a network over the link 65, and the P-GW may connect to a network over the link 75.

Figure 3:
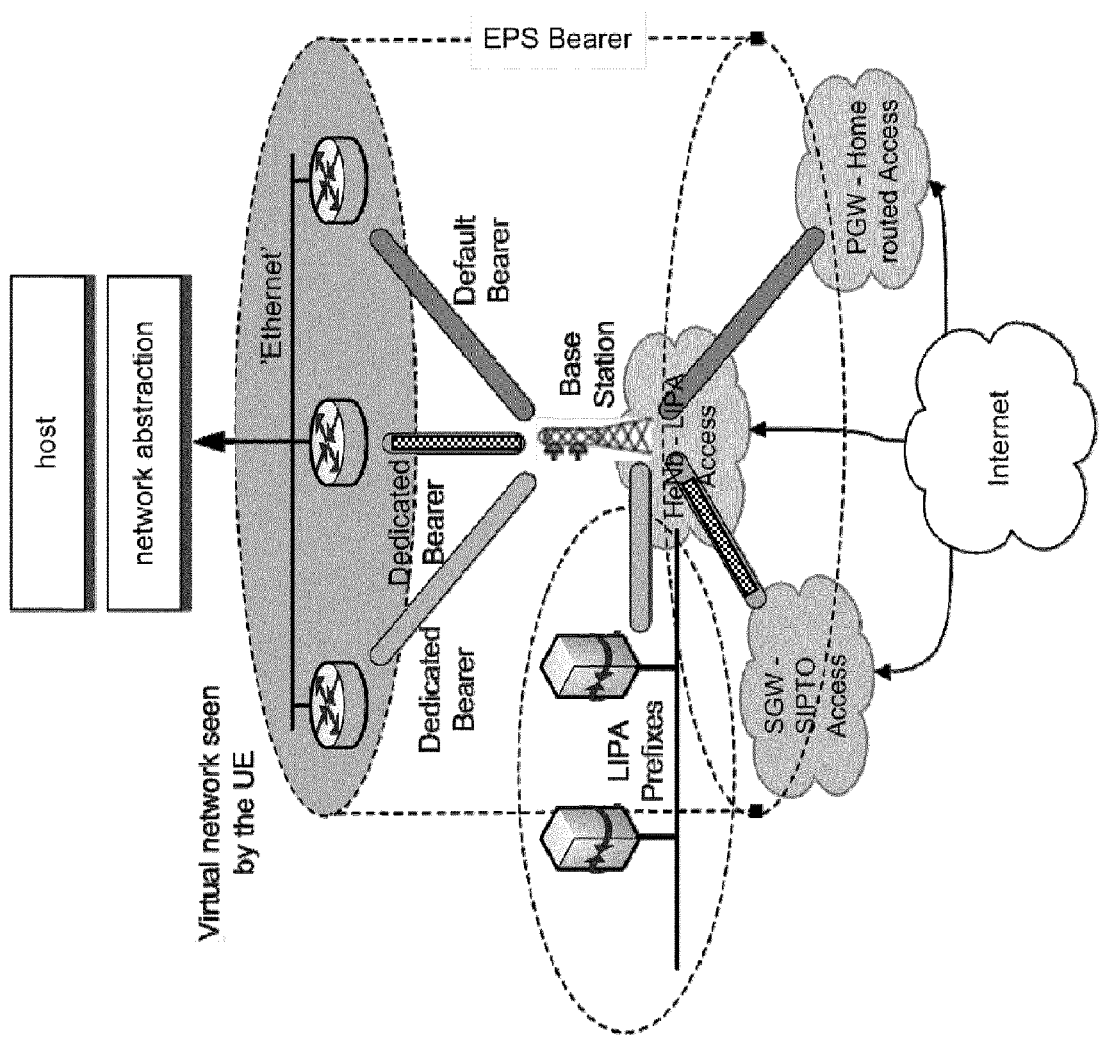
FIG. 3 shows a diagram illustrating a multi-homed link model as seen by an end host, according to an embodiment of the invention.
Figure 4:
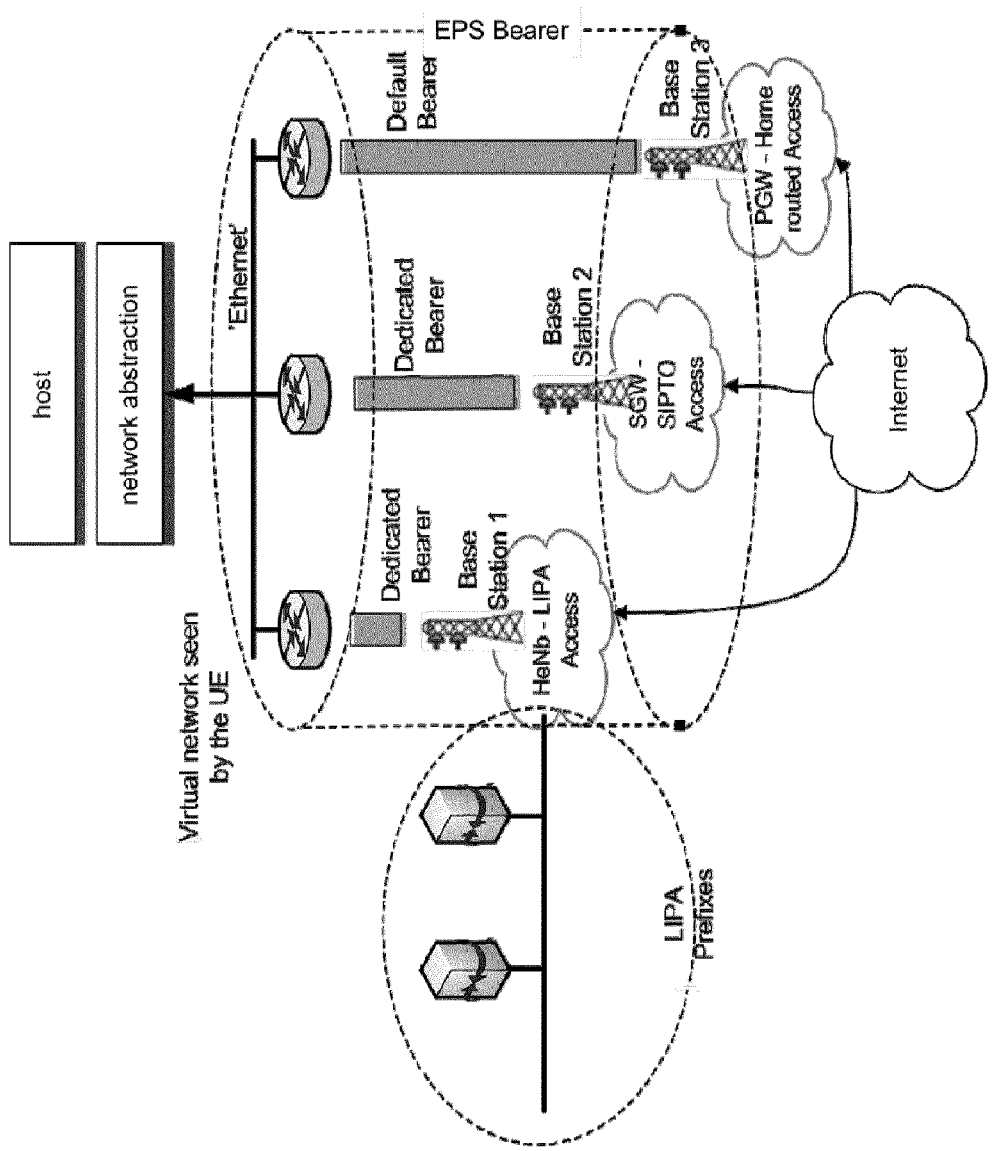
FIG. 4 shows a diagram illustrating a multi-homed link model as seen by the end host, according to another embodiment of the invention.

FIGS. 3 and 4 illustrate how the end host sees a multi-homed PDN connection. Each "route" or "access" is seen as a next-hop router on a single shared link (Ethernet like) that the end host sees. Prefixes on this shared link advertised by each router (SGi interface) are handled as off-link prefixes (all prefixes configured on these links must have the L-bit set 0 with an exception of "LIPA link" whose prefix management is outside mobile operator's control), meaning all packets are always sent to a correct next-hop router instead of trying to communicate directly with other hosts on the link. In case of LIPA-type access the prefixes may be on link (i.e. L-bit is set). In order the IPv6 addressing to work properly, then all nodes using LIPA prefixes are logically on the same level as each next-hop router the UE sees. This also implies that possible multicast traffic originated from nodes from the "LIPA-link" should be sent to other routers on the virtual link as well and multicast traffic originating from other "links" shall be sent to LIPA addressed nodes as well.

FIG. 3 illustrates modelling multi-homing as a number of distinct routers to the end host by tunnelling multiple EPS bearers via a single base station. A UE with single radio may request the communications network system to establish one default EPS bearer and one or more dedicated EPS bearers that are associated to a single PDN connection. According to FIG. 3, multiple EPS bearers over a single radio-link/base station can be used to connect distinct routers and forming a virtual multi-homed network to the UE.

FIG. 4 illustrates modelling multi-homing as a number of distinct routers to the end host by tunnelling multiple EPS bearers via a multiple radio links/base stations. A UE with multi-radio capability may request the communications network system to establish EPS bearers by using multiple radio link connections that are associated to a single PDN connection. According to FIG. 4, multiple EPS bearers over multiple radio-links/base stations can be used to connect distinct routers and forming a virtual multi-homed network to the UE. The used radio link connections may use the same 3GPP RAT on different frequency bands, or a combination of 3GPP and non-3GPP RATs e.g. HSPA+LTE+WLAN.

Figure 5:
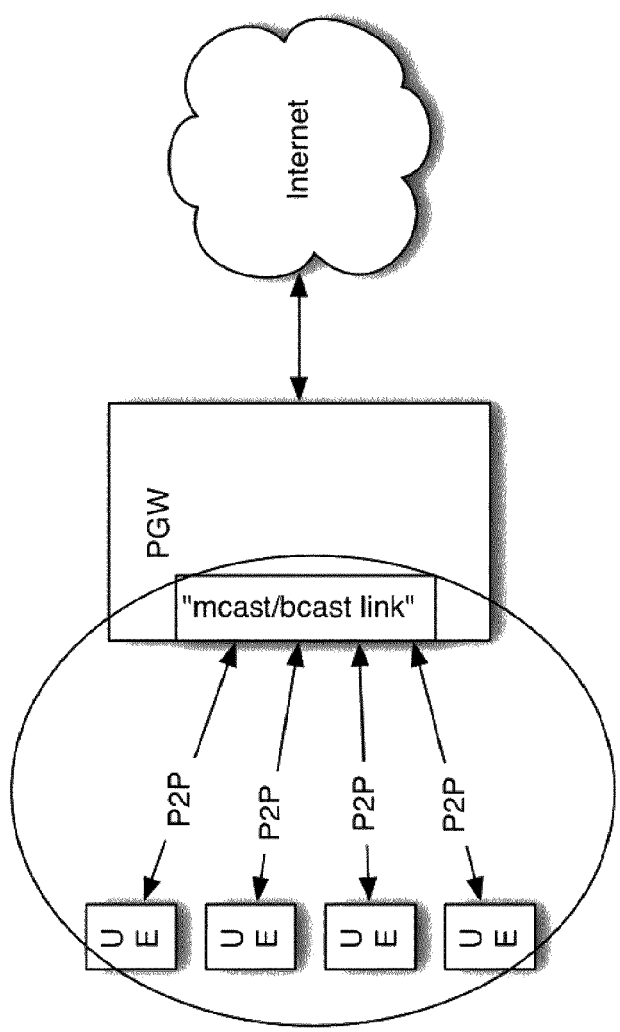
FIG. 5 shows a diagram illustrating a shared prefix model for multiple UEs according to an embodiment of the invention.

It is also possible to have a common shared prefix for hosts attaching to one of the routers, e.g. not having a unique prefix for each end host served by one of the routers. This also changes the 3GPP bearer and PDN connection model. Conventionally, shared prefixes are no supported. Still due to an "off-link" property of the prefixes no host attached to the same router directly sees each other initially. They can also be made always communicate via the router if IPv6 neighbour discovery protocol redirect messages are not supported by the router. This kind of link model behaviour is important to make maximum reuse of existing radio technologies underneath (that eventually are point to point links between the UE and the gateway router). Shared prefix model does not generally work too well with multiple interfaces. However, multiple prefixes are still alright. FIG. 5 shows a diagram illustrating this approach.

FIG. 5 shows a shared prefix model for multiple UEs. A group of P2P radio bearers is abstracted at the P-GW as a single multicast/broadcast capable link. The P-GW acts as an "MLD snooping WLAN switch".

As mentioned above, the P-GW and its SGi interface provide the highest level IP point of attachment to a PDN connection seen in the UE and the communications network system. This link at the P-GW can naturally be a multi-homed link advertising multiple prefixes e.g. for different services. It is proposed to change the 3GPP bearer model so that the UE (3GPP terminal/modem) and the P-GW are allowed to associate multiple IPv6 prefixes to the EPS bearer(s) of a PDN connection.

In particular, the P-GW routes router advertisements at the P-GW (RA PGW, cf. FIG. 2) to the default EPS bearer. The UE (3GPP terminal/modem) passes router advertisements to the modem OS host (laptop PC in FIG. 2, but may be a smart phone as well) that may assign zero or more IPv6 prefixes based on the received RAs and need at application layer.

3GPP based bearer management signaling/procedures can be used to establish this enhanced default EPS bearer service between the UE and the P-GW.

The S-GW and its physical network interface NIC L1 (network interface connection at layer 1) is connected to a local IP network being situated at the edge to RAN and it may provide e.g. offload routing for SIPTO traffic.

It is proposed that the SGi interface at the S-GW is connected logically to the same link seen in the UE.

The S-GW is allowed to associate zero to more IPv6 prefixes to either a dedicated EPS bearer (as shown in FIG. 2) or a default EPS bearer of a PDN connection. The S-GW routes router advertisements at the S-GW (RA SIPTO, cf. FIG. 2) to a dedicated EPS bearer service to the UE on data-path S-GW—(H)eNB—UE. RAs at S-GW are not sent to upper P-GW node. The S-GW routes user SIPTO traffic (IPv6 prefix from the SGi at the S-GW) to/from a local network at the S-GW.

The L-GW and its physical network interface NIC L1 is connected to a local IP network e.g. at Home, Office, Corporate or Enterprise Network and is used to obtain LIPA (Local IP Access) or SIPTO@Local Network service. The L-GW may be co-located in the (H)eNB as shown in FIG. 2 or implemented as a stand-alone L-GW.

It is proposed that the SGi interface at the L-GW is connected logically to the same router link seen in the UE. However, the UE is on the other side of the router than the SGi connected to the L-GW.

The L-GW is allowed to associate zero to more IPv6 prefixes to either a dedicated EPS bearer as shown in FIG. 2 or a default EPS bearer of a PDN connection. The L-GW routes RAs at the L-GW (RA LIPA, cf. FIG. 2) to a dedicated EPS bearer service to the UE on data-path L-GW—(H)eNB—UE. RAs at L-GW are not sent to upper S-GW and P-GW nodes. The L-GW route user LIPA traffic (IPv6 prefix from the SGi at the L-GW) to/from a local network at the L-GW.

The (H)eNB with its physical network interface may provide a simple bridging function to a local IP network without necessitating implementation of a co-located L-GW so that the local IP network becomes connected to the same logical link associated to a PDN connection.

Figure 6:
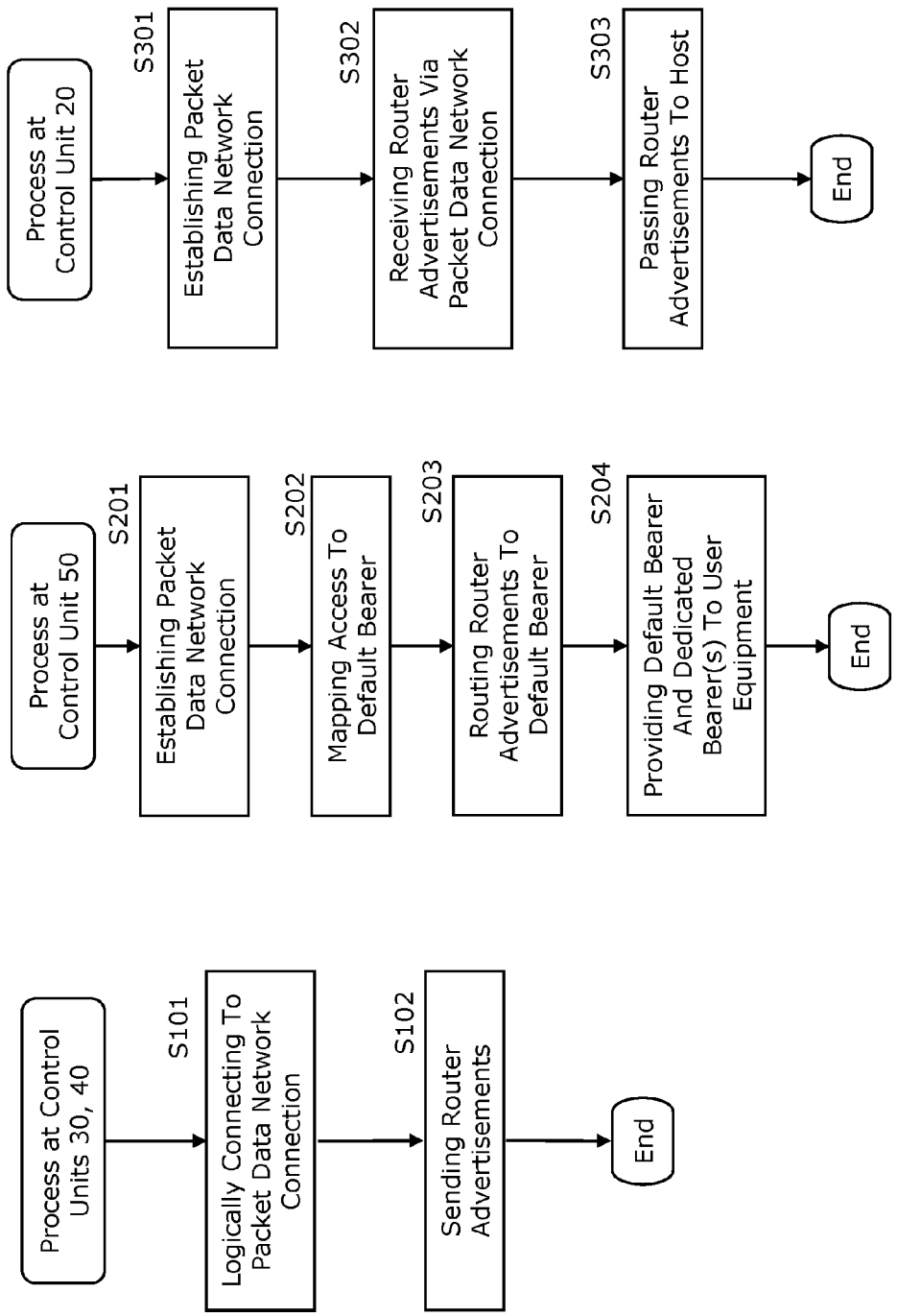
FIG. 6 shows flowcharts illustrating methods performed by entities of a link model according to an embodiment of the invention.

FIG. 6 shows flowcharts illustrating processes performed at the control units 20, 30, 40 and 50.

The control units 30, 40 may perform the functions of the L-GW/(H)eNB and S-GW, using their processing resources, memory resources and interfaces, respectively.

In step S101, the control unit 30, 40 referred to as "second internet protocol network" is logically connected to a packet data network connection provided between a user equipment (control unit 20) and a first internet protocol network (control unit 50) over a radio access network. The second internet protocol network is located on a data path from the first internet protocol network to the user equipment, wherein the first internet protocol network represents the highest level internet protocol point of attachment to the packet data network connection.

In step S102, router advertisements are sent from the second internet protocol network to the user equipment over the radio access network via the packet data network connection.

The second internet protocol network may be connected to the packet data network connection by means of a physical network interface (e.g. SGi) located at the second internet protocol network and establishing tunnels associated with bearer services, e.g. EPS bearer services.

An access of the second internet protocol network within said packet data network connection may be mapped to a dedicated bearer and router advertisements at the second internet protocol network may be routed to the dedicated bearer.

In step S201, the packet data network connection between the user equipment and the first internet protocol network is established over the radio access network.

In step S202, an access of the first internet protocol network within said packet data network connection is mapped to a default bearer.

In step S203, router advertisements at the first internet protocol network are routed to the default bearer.

In step S204, the default bearer associated with the first internet protocol network and a dedicated bearer associated with each of second internet protocol networks logically connected to the packet data network connection are provided to the user equipment.

The default bearer and the dedicated bearer may be provided over a single radio link between the user equipment and the radio access network, as shown e.g. in FIG. 3.

The default bearer and the dedicated bearer may be provided to the user equipment over multiple radio links between the user equipment and the radio access network, as e.g. shown in FIG. 4.

The first and second internet protocol networks may provide their own internet protocol prefix space.

n internet protocol prefixes may be assigned either to the dedicated bearer or the default bearer, wherein n is an integer equal to or greater than zero.

A prefix advertised by the first and second internet protocol networks may be set based on their level internet protocol point of attachment to the packet data network connection.

A common shared prefix may be set for each end host served by the first/second internet protocol network, as shown e.g. in FIG. 5.

In step S301, the packet data network connection is established between the user equipment and the first internet protocol network over the radio access network.

In step S302, router advertisements are received from the first and second internet protocol networks over the radio access network via the packet data network connection.

In step S303, the router advertisements are passed to a host having an operating system according to internet protocol networking principles.

According to an aspect of the invention, an apparatus for a second internet protocol network, such as the control unit 30, 40 shown in FIG. 1, comprises means for logically connecting, to a packet data network connection provided between a user equipment and a first internet protocol network over a radio access network, the second internet protocol network located on a data path from the first internet protocol network to the user equipment, wherein the first internet protocol network represents the highest level internet protocol point of attachment to the packet data network connection, and means for sending router advertisements from the second internet protocol network to the user equipment over the radio access network via the packet data network connection.

The means for logically connecting the second internet protocol network to the packet data network connection may comprise a physical network interface located at the second internet protocol network and means for establishing tunnels associated with bearer services.

The apparatus may further comprise means for mapping an access of the second internet protocol network within said packet data network connection to a dedicated bearer and means for routing router advertisements at the second internet protocol network to the dedicated bearer.

The apparatus may further comprise means for providing the dedicated bearer over a single radio link between the user equipment and the radio access network.

Alternatively or in addition, the apparatus may further comprise means for providing the dedicated bearer to the user equipment over multiple radio links between the user equipment and the radio access network.

The apparatus may further comprise means for associating n internet protocol prefixes to the dedicated bearer, wherein n is an integer equal to or greater than zero.

The apparatus may further comprises means for setting a prefix advertised by the second internet protocol network based on its level internet protocol point of attachment to the packet data network connection.

The apparatus may further comprise means for setting a common shared prefix for each end host served by the second internet protocol network.

The above-described means may be implemented by the processing resources 31, 41, memory resources 32, 42 and interfaces 33, 43 of the control units 30, 40, respectively.

According to an aspect of the invention, an apparatus of a first internet protocol network, such as the control unit 50, comprises means for establishing a packet data network connection between a user equipment and the first internet protocol network over a radio access network, means for mapping an access of the first internet protocol network within said packet data network connection to a default bearer, means for routing router advertisements at the first internet protocol network to the default bearer, and means for providing the default bearer associated with the first internet protocol network and a dedicated bearer associated with each of second internet protocol networks logically connected to the packet data network connection, to the user equipment.

The apparatus may comprise means for providing the default bearer over a single radio link between the user equipment and the radio access network.

Alternatively or in addition, the apparatus may comprise means for providing the default bearer to the user equipment over multiple radio links between the user equipment and the radio access network.

The first internet protocol network may provide its own internet protocol prefix space.

The apparatus may comprise means for associating n internet protocol prefixes to the default bearer, wherein n is an integer equal to or greater than zero.

The apparatus may further comprise means for setting a prefix advertised by the first internet protocol network based on its level internet protocol point of attachment to the packet data network connection.

The apparatus may further comprise means for setting a common shared prefix for each end host served by the first internet protocol network.

The above-described means may be implemented by the processing resources 51, memory resources 52 and interfaces 53 of the control unit 50.

According to an aspect of the invention, a user equipment such as the control unit 20, comprises means for establishing a packet data network connection between the user equipment and a first internet protocol network over a radio access network, means for receiving router advertisements from the first internet protocol network and second internet protocol networks over the radio access network via the packet data network connection, wherein the first internet protocol network represents the highest level internet protocol point of attachment to the packet data network connection, and wherein the second internet protocol networks are located on a data path from the first internet protocol network to the user equipment and are logically connected to the packet data network connection, and means for passing the router advertisements to a host having an operating system according to internet protocol networking principles.

The above-described means may be implemented by the processing resources 21, memory resources 22 and interfaces 23 of the control unit 20.

According to an aspect of the invention, a second internet protocol network is logically connected to a packet data network connection provided between a user equipment and a first internet protocol network over a radio access network, the second internet protocol network located on a data path from the first internet protocol network to the user equipment. The first internet protocol network represents the highest level internet protocol point of attachment to the packet data network connection. Router advertisements are sent from the second internet protocol network to the user equipment over the radio access network via the packet data network connection.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method for a second internet protocol network, the method comprising:
    logically connecting, to a single packet data network connection provided between a user equipment and a first internet protocol network over a radio access network, the second internet protocol network located on a data path from the first internet protocol network to the user equipment, wherein the first internet protocol network represents the highest level internet protocol point of attachment to the single packet data network connection; and
    sending router advertisements from the second internet protocol network and the first internet protocol network to the user equipment over the radio access network via the single packet data network connection.

2. The method of claim 1, comprising:
    logically connecting the second internet protocol network to the single packet data network connection by means of a physical network interface located at the second internet protocol network and establishing tunnels associated with bearer services.

3. The method of claim 1, comprising:
    mapping an access of the second internet protocol network within said single packet data network connection to a dedicated bearer and routing router advertisements at the second internet protocol network to the dedicated bearer.

4. A computer program product including a program for a processing device, comprising software code portions for performing the steps of claim 1 when the program is run on the processing device.

5. An apparatus of a second internet protocol network, the apparatus comprising:
   at least one memory comprising computer program code;
   at least one processor;
   wherein the at least one memory and the computer program code are configured, with the at least one processor, to cause the apparatus at least to:
   logically connect, to a single packet data network connection provided between a user equipment and a first internet protocol network over a radio access network, the second internet protocol network located on a data path from the first internet protocol network to the user equipment, wherein the first internet protocol network represents the highest level internet protocol point of attachment to the single packet data network connection; and
   send router advertisements from the second internet protocol network and the first internet protocol network to the user equipment over the radio access network via the single packet data network connection.

6. The apparatus of claim 5, wherein the at least one memory and the computer program code are configured, with the at least one processor, to cause the apparatus at least to:
   logically connect the second internet protocol network to the single packet data network connection by means of a physical network interface located at the second internet protocol network and establish tunnels associated with bearer services.

7. The apparatus of claim 5, wherein the at least one memory and the computer program code are configured, with the at least one processor, to cause the apparatus at least to:
   map an access of the second internet protocol network within said single packet data network connection to a dedicated bearer and route router advertisements at the second internet protocol network to the dedicated bearer.

8. The apparatus of claim 5, wherein the at least one memory and the computer program code are configured, with the at least one processor, to cause the apparatus at least to:
   provide the default bearer and the dedicated bearer over a single radio link between the user equipment and the radio access network.

9. The apparatus according to claim 5, wherein the at least one memory and the computer program code are configured, with the at least one processor, to cause the apparatus at least to:
   provide the default bearer or dedicated bearer to the user equipment over multiple radio links between the user equipment and the radio access network.

10. The apparatus of claim 5, wherein the at least one memory and the computer program code are configured, with the at least one processor, to cause the apparatus at least to:
    associate n internet protocol prefixes either to the dedicated bearer or the default bearer, wherein n is an integer equal to or greater than zero.

\* \* \* \* \*